United States Patent
Grost et al.

(10) Patent No.: US 10,229,671 B2
(45) Date of Patent: Mar. 12, 2019

(54) PRIORITIZED CONTENT LOADING FOR VEHICLE AUTOMATIC SPEECH RECOGNITION SYSTEMS

(71) Applicant: GM Global Technology Operations LLC, Detroit, MI (US)

(72) Inventors: Timothy J. Grost, Clarkston, MI (US); Ute Winter, Petach Tiqwa (IL); Matthew M. Highstrom, South Lyon, MI (US); Cody R. Hansen, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 436 days.

(21) Appl. No.: 14/957,335

(22) Filed: Dec. 2, 2015

(65) Prior Publication Data

US 2017/0162191 A1    Jun. 8, 2017

(51) Int. Cl.
| | |
|---|---|
| *G10L 21/00* | (2013.01) |
| *G10L 15/07* | (2013.01) |
| *G10L 15/19* | (2013.01) |
| *G10L 15/28* | (2013.01) |
| *G10L 25/00* | (2013.01) |
| *G10L 15/22* | (2006.01) |

(52) U.S. Cl.
CPC ............ *G10L 15/075* (2013.01); *G10L 15/19* (2013.01); *G10L 15/285* (2013.01); *G10L 15/22* (2013.01); *G10L 2015/223* (2013.01)

(58) Field of Classification Search
CPC ..... G10L 15/075; G10L 15/285; G10L 15/19; G10L 15/22; G10L 2015/223
USPC ......................... 704/231, 246, 259, 270, 275
See application file for complete search history.

(56) References Cited

U.S. PATENT DOCUMENTS

| | | | |
|---|---|---|---|
| 2007/0094033 A1* | 4/2007 | Nagashima | ............ G10L 15/22 704/272 |
| 2016/0364100 A1* | 12/2016 | Nakasone | .............. B60K 37/02 |

\* cited by examiner

*Primary Examiner* — Thierry L Pham
(74) *Attorney, Agent, or Firm* — David Willoughby; Reising Ethington P.C.

(57) ABSTRACT

A method of loading content items for accessibility by a vehicle automatic speech recognition (ASR) system. The method tracks content items requested by one or more users and prioritizes the loading of requested content items and/or selectively loads requested content items at least partially based on the interaction history of one or more users. The method may also adapt the ASR system based on the interaction history of one or more users to make preferred content items readily accessible instead of randomly accessible.

9 Claims, 3 Drawing Sheets

PRIORITIZED CONTENT LOADING FOR VEHICLE AUTOMATIC SPEECH RECOGNITION SYSTEMS

TECHNICAL FIELD

The present invention relates to loading content for vehicle automatic speech recognition (ASR) systems, and more particularly, to selectively loading content based on the system interaction history of one or more users.

BACKGROUND

The size of personal data content has been consistently increasing, which can often lead to problems for vehicle automatic speech recognition (ASR) systems. Currently, content for vehicle ASR systems may be loaded based on non-specific or generic criteria, such as alphabetical order, until the storage limit of the system memory is reached. Even if it may be possible to load all of the content, it may not be desirable to load all of the content, because if a majority of the content will not be requested, the system performance might be negatively impacted. If the size of the personal data is too voluminous to be loaded and made fully accessible by the ASR system, user commands might not be understood, as speech recognition accuracy often decreases with increasing amounts of data. Thus, users may get frustrated when their requests are not understood because requested content items are randomly available as opposed to being readily available.

SUMMARY

According to an embodiment of the invention, there is provided a method of loading content for a vehicle automatic speech recognition (ASR) system. The vehicle ASR system includes a processor and memory. The method includes tracking requested content items, establishing a count of related content items, calculating likelihood criteria for requested content items and related content items using the count of related content items, and prioritizing the loading of content items based on the likelihood criteria such that the requested content items and related content items are loaded into the memory of the vehicle ASR system in favor of non-requested content items or non-related content items.

According to another embodiment of the invention, there is provided a method of loading content for a vehicle automatic speech recognition (ASR) system. The vehicle ASR system includes a processor and memory. The method includes tracking requested content items and categorizing the requested content items into a plurality of content item categories. The content item categories include media content items, phone content items, and navigation content items. The method also includes selectively loading content items from each content item category such that requested content items with a higher count are loaded onto the memory of the vehicle ASR system before requested content items with a lower count.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The method of loading content for a vehicle automatic speech recognition (ASR) system described below may leverage ASR system knowledge about the interaction history of one or more users. The interaction history, along with other pertinent information, may be used to prioritize content items which are more likely to be requested by a user. By helping to ensure that the most likely content is readily available, as opposed to being randomly available, accuracy of the ASR system and the effectiveness of speech interaction may result in an improved user experience. Typically, users only access and/or request approximately 20% of their content, so by preferentially limiting the content that is loaded, ASR system features may be improved.

Figure 1:
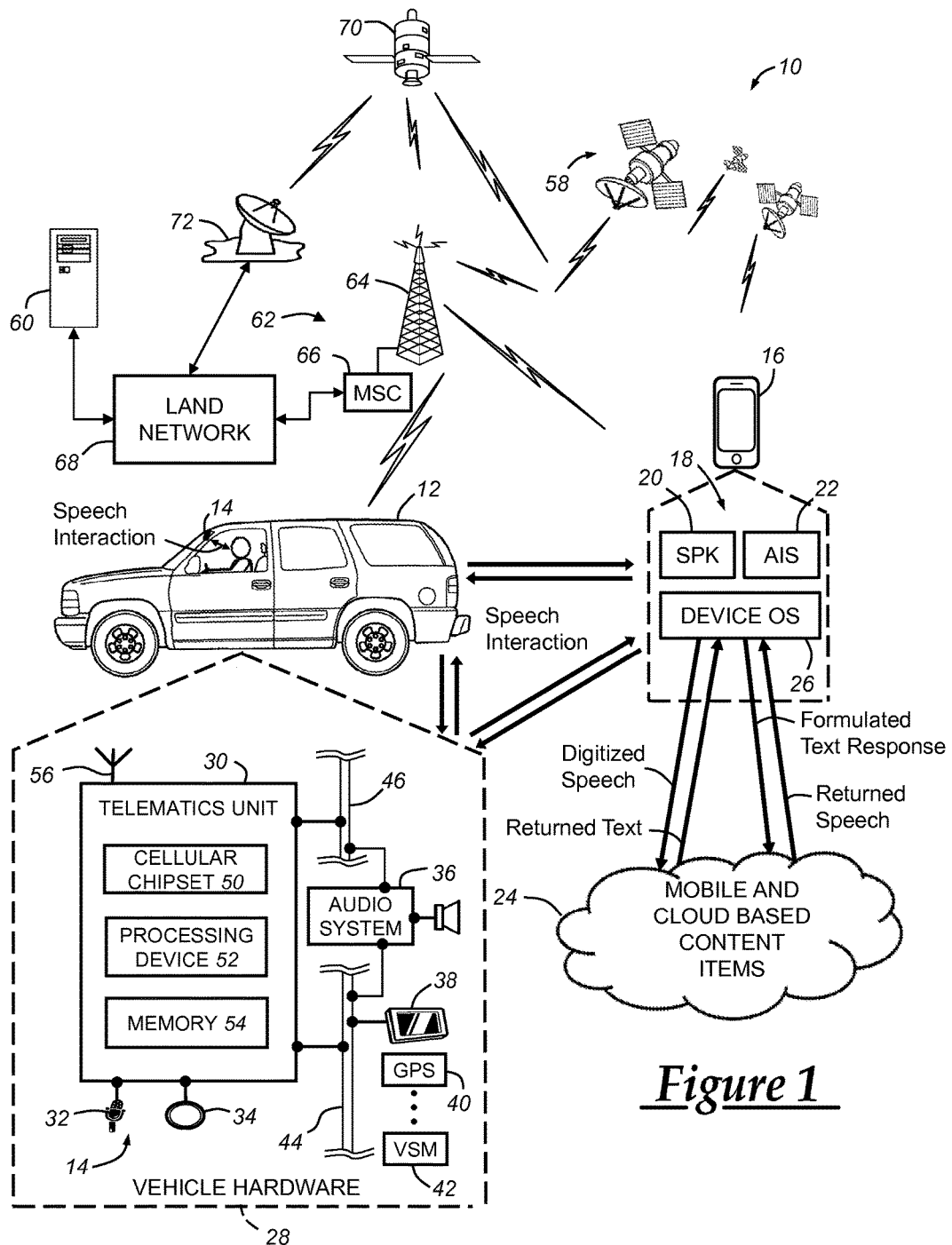
FIG. 1 is a block diagram depicting an embodiment of a speech user interface and communications system that is capable of utilizing the method disclosed herein, as well as providing input for the method disclosed herein.

FIG. 1 depicts one embodiment of a speech-based user interface and communication system 10 as it could be used for providing various content items via a mobile device, the vehicle itself, or another land or cloud based application. The content items can be provided to a vehicle driver in a hands-free manner. Some embodiments can be implemented to provide a hands-free experience that may require some interaction with the mobile device, such as to place it in a listening mode, while other embodiments can be carried out fully hands-free while, for example, the mobile device is in the user's pocket, purse, or briefcase, with no physical access needed to the device.

In the illustrated embodiment, a driver of a vehicle 12 interacts via speech with an on-board, installed user interface 14 that can communicate via a short range wireless connection with the driver's mobile device 16, which in this case is a cellular phone. Mobile device 16 can be any portable device capable of wireless communication and digital processing whether using a microprocessor or some simpler or more complex circuitry. Thus, mobile devices can include cellular phones, PDAs, laptops, notebooks, netbooks and other personal electronic devices. The cellular phone 16 depicted in FIG. 1 is commonly referred to as a smartphone given that it permits the user to add software applications (apps) to the smartphone that perform functions beyond telephony. Phone 16 includes a touchscreen interface, one or more manual pushbuttons, a microphone, speaker, and internal circuitry (hardware) including a microprocessor, memory for storage of software and data, and communication circuitry that includes at least short range wireless communication technology such as Bluetooth and/or WiFi, but also cellular communication technology such as a cellular chipset for CDMA, GSM, or other standardized technology. These various components of mobile device 16 may be conventional if desired, and thus are not separately illustrated or described in detail herein.

Apart from the mobile device hardware, cellular phone 16 may include a mobile voice platform (MVP) 18 comprising software running on the mobile device. MVP 18 can include a speech platform kernel (SPK) 20 and an application interface suite (AIS) 22, both of which are program modules comprising computer instructions that, upon execution by the device's processor, carry out their respective module's functions. Rather than providing automated speech processing (ASR) on the mobile device itself, remotely located (mobile and cloud based) speech services may provide mobile and cloud based content items 24 are oftentimes used, although in some embodiments ASR can be carried out on hardware within the vehicle 12, either with or without access to remotely located speech modules, grammars, and computing facilities. Mobile device 16 also includes an operating system (OS) 26 that provides root level functions, including for example inter-application communication mechanisms and input/output (I/O) interfacing between device hardware and the software modules and applications running on device 16. Included in these hardware interfacing functions of the OS are the communication protocols used by the device to communicate with various speech services for the provision of mobile and cloud based content items 24, as well as other services that may be available via the Internet or other network. Oftentimes, content items 24 from the mobile device 16 may be uploaded and stored in memory located within hardware of the vehicle 12. Although shown outside the vehicle in FIG. 1 solely for diagrammatic illustration, the typical use of the mobile device 16 as a part of the speech user interface and communications system 10 will involve circumstances in which the mobile device in located in the vehicle, such as when the driver is operating the vehicle on the roadway.

In general, hands-free access to services using mobile voice platform 18 or another vehicle, cloud, or land based module will involve carrying out a completed speech session without any physical interaction. This broadly includes receiving a speech input from a user requesting a content item, obtaining the content item from a service that is responsive to the context of the speech input, and providing the content item itself to the user or providing the content item as a speech response presented to the user. Using vehicle 12 of FIG. 1, the driver (user) may interact with the mobile device, for example, to carry out the speech session via the user interface 14. This may include establishing a short range wireless connection between the in-vehicle user interface 14 and mobile device 16, for example, that then allows the microphone and speaker of the user interface 14 to be used to receive and present speech, respectively, to the driver or other occupant. The speech input may be sent as digitized speech over this short range wireless connection via a digital communication protocol such as Bluetooth or WiFi. The driver may also interact with vehicle hardware to carry out the speech session, which is detailed further below.

Vehicle 12 is depicted in the illustrated embodiment as a sports utility vehicle (SUV), but it should be appreciated that any other vehicle including passenger cars, trucks, motorcycles, recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. The microphone 32 and one or more pushbuttons or other control inputs 34 may serve to form the user interface 14. Some of these devices can be connected directly to the telematics unit such as, for example, the microphone 32 and pushbutton(s) 34, whereas others may be indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with a call center, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different content items including those related to navigation, telephony, emergency assistance, vehicle diagnostics, media and infotainment, etc. Data can be sent either via a data connection, such as via packet data transmission over a data channel, or via a voice channel using techniques known in the art. For combined services that involve both voice communication (e.g., with a live advisor or voice response unit at a call center) and data communication (e.g., to provide GPS location data or vehicle diagnostic data to a call center), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device or processor 52, one or more digital memory devices that comprise memory 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

In one embodiment, the processor 52 and the memory 54 of the telematics unit 30 serves as the processor and memory for an ASR system; however, it should be understood that the ASR system memory may include multiple memory devices from a variety of sources not pictured. Accordingly, one or more types of memory 54 may include non-volatile memory, drives, mass storage devices, and may include any suitable software, algorithms and/or subroutines that provide the data storage component with the capability to store, organize, and permit retrieval of content. Memory 54 may comprise a single component or a plurality of discrete components acting together. Memory 54 may be dedicated for use exclusively with the telematics unit 30, while in other examples, memory 54 may be shared with other systems off-board or on-board vehicle 12.

Telematics unit 30 can be used to provide a diverse range of content items that often involve wireless communication to and/or from the vehicle. Such content items may include, but are not limited to: navigation content items such as turn-by-turn directions, address lists, and other navigation-related services that are provided in conjunction with the GPS-based vehicle navigation module 40; vehicle diagnostic content items such as airbag deployment notifications and other emergency or roadside assistance-related notifications and services that may be provided in connection with one or more collision sensor interface modules such as a body control module (not shown), as well as diagnostic reporting using one or more diagnostic modules; and infotainment-related content items (e.g., media content items and application-based content items) where music, webpages, movies, television programs, application programs, videogames and/or other information are downloaded by an infotainment module (not shown) or the telematics unit 30 itself and stored for current or later playback. The above-listed content items are by no means an exhaustive list of all of the capabilities of telematics unit 30, but are simply an enumeration of some of the content items that the telematics unit is capable of offering. Moreover, content items may come from various other sources besides the telematics unit, either directly or indirectly. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 may receive radio signals from a constellation 58 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. Navigation content items can be provided using a dedicated in-vehicle navigation module (which can be part of GPS module 40), or some or all navigation content items can be provided via telematics unit 30, wherein the position information is sent to a remote location for purposes of providing the vehicle with requested destinations, navigation maps, map annotations (points of interest, restaurants, etc.), route calculations, and the like. The position information can be supplied to a call center or other remote computer system, such as computer 60, for other purposes, such as fleet management. Also, new or updated map data can be downloaded to the GPS module 40 from a call center via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that can provide a myriad of real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a user interface 14 that provides vehicle occupants with a means of providing and/or receiving information, including microphone 32, pushbuttons(s) 34, audio system 36, and visual display 38. As used herein, the term 'user interface' broadly includes any suitable form of electronic device, including both hardware and software components, which is located on the vehicle and enables a vehicle user to communicate with or through a component of the vehicle. Microphone 32 provides audio input to the telematics unit 30 to enable the driver or other occupant to provide voice commands and carry out hands-free calling via a wireless carrier system 62. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to a call center. Audio system 36 can provide media content items to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 62 is preferably a cellular telephone system that includes a plurality of cell towers 64 (only one shown), one or more mobile switching centers (MSCs) 66, as well as any other networking components required to connect wireless carrier system 62 with a land network 68. Each cell tower 64 includes sending and receiving antennas and a base station, with the base stations from different cell towers being connected to the MSC 66 either directly or via intermediary equipment such as a base station controller. Cellular system 62 can implement any suitable communications technology, including for example, analog technologies such as AMPS, or digital technologies such as CDMA (e.g., CDMA2000) or GSM/GPRS. As will be appreciated by those skilled in the art, various cell tower/base station/MSC arrangements are possible and could be used with wireless system 62. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 62, a different wireless carrier system in the form of satellite communication can be used to provide uni-directional or bi-directional communication with the vehicle. This can be done using one or more communication satellites 70 and an uplink transmitting station 72. Uni-directional communication can be, for example, satellite radio services, wherein programming content (news, music, etc.) is received by transmitting station 72, packaged for upload, and then sent to the satellite 70, which broadcasts the programming to subscribers. Bi-directional communication can be, for example, satellite telephony services using satellite 70 to relay telephone communications between the vehicle 12 and station 72. If used, this satellite telephony can be utilized either in addition to or in lieu of wireless carrier system 62.

Land network 68 may be a conventional land-based telecommunications network that may be connected to one or more landline telephones and can connect wireless carrier system 62 to such things as the mobile and cloud based applications for providing content items 24 and other computers or servers 60, such as a personal computer located in a residence or other facility. For example, land network 68 may include a public switched telephone network (PSTN) such as that used to provide hardwired telephony, packet-switched data communications, and the Internet infrastructure. One or more segments of land network 68 could be implemented through the use of a standard wired network, a fiber or other optical network, a cable network, power lines, other wireless networks such as wireless local area networks (WLANs), or networks providing broadband wireless access (BWA), or any combination thereof. Furthermore, the speech and cloud content items shown in FIG. 1 need not be provided via land network 68, but could include wireless telephony equipment so that it can communicate directly with a wireless network, such as wireless carrier system 62.

Computer 60 can be one of a number of computers accessible via a private or public network such as the Internet. Each such computer 60 can be used for one or more purposes, such as a web server accessible by the vehicle over wireless carrier 62 via user interface 14/mobile device 16, and/or via the telematics unit 30. Other such accessible computers 60 can be, for example: a service center computer where diagnostic information and other vehicle data can be uploaded from the vehicle via the telematics unit 30; a client computer used by the vehicle owner or other telematics service subscriber for such purposes as accessing or receiving vehicle data or to setting up or configuring subscriber preferences or controlling vehicle functions; or a third party repository to or from which vehicle data or other information is provided. A computer 60 can also be used for providing Internet connectivity such as DNS services or as a network address server that uses DHCP or other suitable protocol to assign an IP address to the vehicle 12 and/or to the mobile device 16. When used as a client computer 60 by the vehicle owner, such as within a residence, wireless connectivity between the mobile device 16 and computer 60 may be provided using any suitable short range wireless communication technology, such as Bluetooth or any of the 802.11 protocols.

The speech services and provision of content items identified with reference to FIG. 1 can be implemented in various ways and in some embodiments, may be uniquely designed or contain specific grammars or models designed to support the speech user interface 10. In other embodiments, a generalized cloud ASR service is used as the vehicle ASR; that is, one in which, although it may permit parameter specifications for particular language models and other general configurations of the speech recognition engine, may not use a grammar tailored to the session contexts expected for the user speech session. As shown in FIG. 1, speech interaction may occur between the mobile voice platform 18 of the mobile device 16, the user interface 14 of the vehicle 12, which typically includes or is part of the vehicle ASR system, which will be detailed further below.

Figure 2:
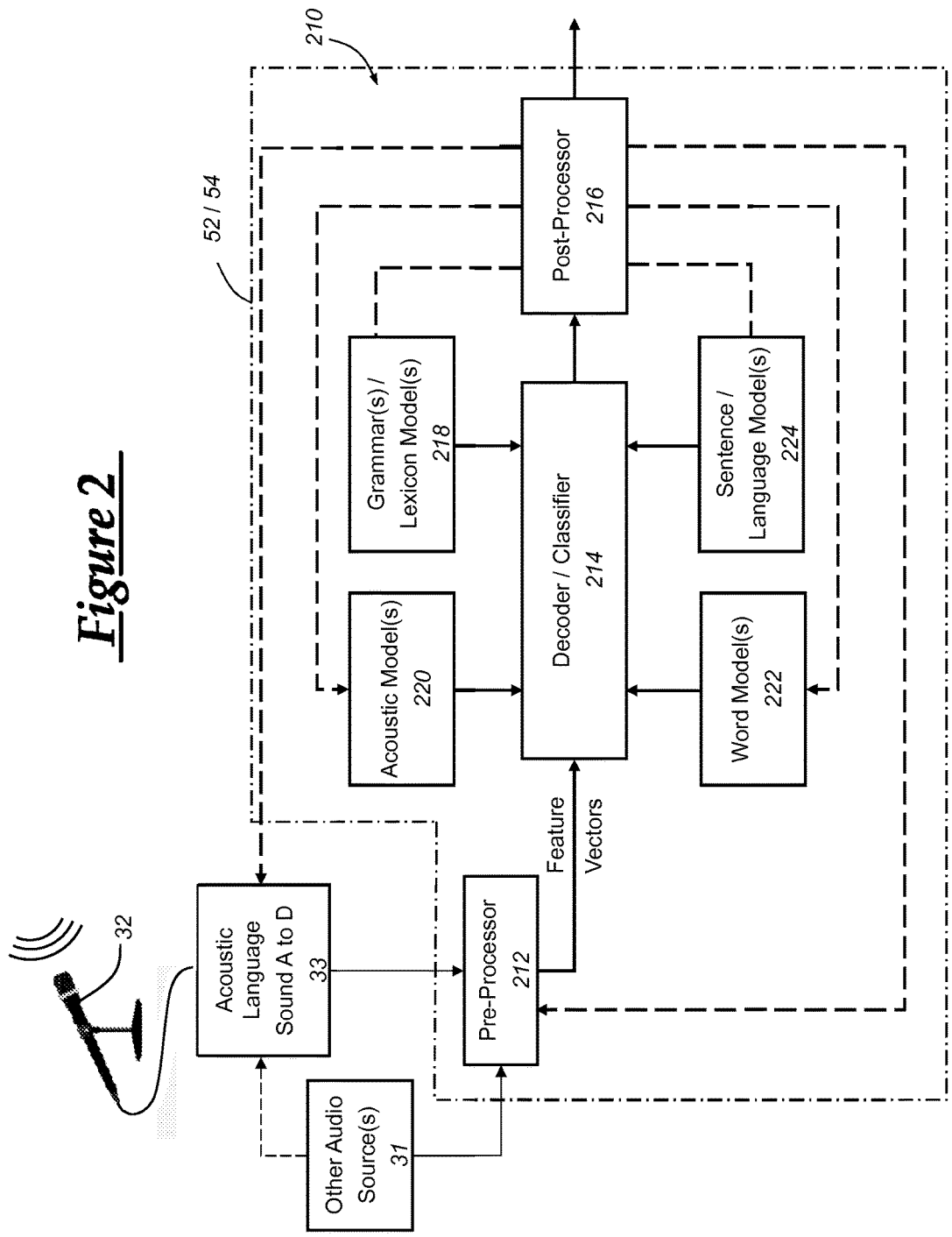
FIG. 2 is a block diagram depicting an embodiment of an automatic speech recognition (ASR) system.

Turning now to FIG. 2, there is shown an illustrative architecture for a vehicle ASR system 210 that can be used in conjunction with the presently disclosed method. In general, a vehicle occupant vocally interacts with the ASR system for one or more of the following fundamental purposes: training the system to understand a vehicle occupant's particular voice; storing discrete speech such as a spoken nametag or a spoken control word like a numeral or keyword; or recognizing the vehicle occupant's speech for any suitable purpose such as requesting a content item which may include various voice dialing operations, menu navigation, transcription, service requests, vehicle device or device function control, or the like. Generally, the ASR system extracts acoustic data from human speech, compares and contrasts the acoustic data to stored subword data, selects an appropriate subword which can be concatenated with other selected subwords, and outputs the concatenated subwords or words for post-processing such as dictation or transcription, address book dialing, storing to memory, training ASR models or adaptation parameters, or the like.

ASR systems are generally known to those skilled in the art, and FIG. 2 illustrates just one specific illustrative ASR system 210. The system 210 includes a device to receive speech such as the telematics microphone 32, and an acoustic interface 33 such as a sound card of the telematics unit 30 having an analog to digital converter to digitize the speech into acoustic data. The system 210 also includes a memory such as the telematics memory 54 for storing the acoustic data and storing speech recognition software and databases for content items, and a processor such as the telematics processor 52 to process the acoustic data. The processor functions with the memory and in conjunction with the following modules: one or more front-end processors or pre-processor software modules 212 for parsing streams of the acoustic data of the speech into parametric representations such as acoustic features; one or more decoder software modules 214 for decoding the acoustic features to yield digital subword or word output data corresponding to the input speech utterances; and one or more post-processor software modules 216 for using the output data from the decoder module(s) 214 for any suitable purpose.

The system 210 can also receive speech from any other suitable audio source(s) 31, which can be directly communicated with the pre-processor software module(s) 212 as shown in solid line or indirectly communicated therewith via the acoustic interface 33. The audio source(s) 31 can include, for example, a telephonic source of audio such as a voice mail system, or other telephonic or application-based services of any kind.

One or more modules or models can be used as input to the decoder module(s) 214. First, grammar and/or lexicon model(s) 218 can provide rules governing which words can logically follow other words to form valid sentences. In a broad sense, a grammar can define a universe of vocabulary the system 210 expects at any given time in any given ASR mode. For example, if the system 210 is in a training mode for training commands, then the grammar model(s) 218 can include all commands known to and used by the system 210. In another example, if the system 210 is in a main menu mode, then the active grammar model(s) 218 can include all main menu commands expected by the system 210 such as call, dial, exit, delete, directory, or the like. Second, acoustic model(s) 220 can assist with selection of most likely subwords or words corresponding to input from the pre-processor module(s) 212. Third, word model(s) 222 and sentence/language model(s) 224 can provide rules, syntax, and/or semantics in placing the selected subwords or words into word or sentence context. Also, the sentence/language model(s) 224 can define a universe of sentences the system 210 expects at any given time in any given ASR mode, and/or can provide rules, etc., governing which sentences can logically follow other sentences to form valid extended speech.

According to an alternative illustrative embodiment, some or all of the ASR system 210 can be resident on, and processed using, computing equipment in a location remote from the vehicle 12 such as a call center. For example, grammar models, acoustic models, and the like can be stored in memory of a servers and/or database in the call center and communicated to the vehicle telematics unit 30 for in-vehicle speech processing. In other words, the ASR system 210 can be resident in the telematics unit 30, distributed across a call center and the vehicle 12 in any desired manner, and/or resident at a call center.

First, acoustic data is extracted from human speech wherein a user speaks into the microphone 32, which converts the utterances into electrical signals and communicates such signals to the acoustic interface 33. A sound-responsive element in the microphone 32 can capture the user's speech utterances as variations in air pressure and converts the utterances into corresponding variations of analog electrical signals such as direct current or voltage. The acoustic interface 33 receives the analog electrical signals, which are first sampled such that values of the analog signal are captured at discrete instants of time, and are then quantized such that the amplitudes of the analog signals are converted at each sampling instant into a continuous stream of digital speech data. In other words, the acoustic interface 33 converts the analog electrical signals into digital electronic signals. The digital data are binary bits which are buffered in the telematics memory 54 and then processed by the telematics processor 52 or can be processed as they are initially received by the processor 52 in real-time.

Second, the pre-processor module(s) 212 can transform the continuous stream of digital speech data into discrete sequences of acoustic parameters. More specifically, the processor 52 can execute the pre-processor module(s) 212 to segment the digital speech data into overlapping phonetic or acoustic frames of, for example, 10-30 ms duration. The frames correspond to acoustic subwords such as syllables, demi-syllables, phones, diphones, phonemes, or the like. The pre-processor module(s) 212 also performs phonetic analysis to extract acoustic parameters from the occupant's speech such as time-varying feature vectors, from within each frame. Utterances within the occupant's speech can be represented as sequences of these feature vectors. For example, and as known to those skilled in the art, feature vectors can be extracted and can include, for example, vocal pitch, energy profiles, spectral attributes, and/or cepstral coefficients that can be obtained by performing Fourier transforms of the frames and decorrelating acoustic spectra using cosine transforms. Acoustic frames and corresponding parameters covering a particular duration of speech are concatenated into unknown test pattern of speech to be decoded.

Third, the processor can execute the decoder module(s) 214 to process the incoming feature vectors of each test pattern. The decoder module 214 is also known as a recognition engine or classifier, and uses stored known reference patterns of speech. Like the test patterns, the reference patterns are defined as a concatenation of related acoustic frames and corresponding parameters. The decoder module 214 compares and contrasts the acoustic feature vectors of a subword test pattern to be recognized with stored subword reference patterns, assesses the magnitude of the differences or similarities therebetween, and ultimately uses decision logic to choose a best matching subword as the recognized subword. In general, the best matching subword is that which corresponds to the stored known reference pattern that has a minimum dissimilarity to, or highest probability of being, the test pattern as determined by any of various techniques known to those skilled in the art to analyze and recognize subwords. Such techniques can include dynamic time-warping classifiers, artificial intelligence techniques, neural networks, free phoneme recognizers, and/or probabilistic pattern matchers such as Hidden Markov Model (HMM) engines.

In one example, the speech recognition decoder 214 processes the feature vectors using the appropriate acoustic models, grammars, and algorithms to generate an N-best list of reference patterns. As used herein, the term reference patterns is interchangeable with models, waveforms, templates, rich signal models, exemplars, hypotheses, or other types of references. A reference pattern can include a series of feature vectors representative of one or more words or subwords and can be based on particular speakers, speaking styles, and audible environmental conditions. Those skilled in the art will recognize that reference patterns can be generated by suitable reference pattern training of the ASR system and stored in memory. Those skilled in the art will also recognize that stored reference patterns can be manipulated, wherein parameter values of the reference patterns are adapted based on differences in speech input signals between reference pattern training and actual use of the ASR system. For example, a set of reference patterns trained for one vehicle occupant or certain acoustic conditions can be adapted and saved as another set of reference patterns for a different vehicle occupant or different acoustic conditions, based on a limited amount of training data from the different vehicle occupant or the different acoustic conditions. In other words, the reference patterns are not necessarily fixed and can be adjusted during speech recognition.

Using the in-vocabulary grammar and any suitable decoder algorithm(s) and acoustic model(s), the processor accesses from memory several reference patterns interpretive of the test pattern. For example, the processor can generate, and store to memory, a list of N-best vocabulary results or reference patterns, along with corresponding parameter values. Illustrative parameter values can include confidence scores of each reference pattern in the N-best list of vocabulary and associated segment durations, likelihood scores, signal-to-noise ratio (SNR) values, and/or the like. The N-best list of vocabulary can be ordered by descending magnitude of the parameter value(s). For example, the vocabulary reference pattern with the highest confidence score is the first best reference pattern, and so on. Once a string of recognized subwords are established, they can be used to construct words with input from the word models 222 and to construct sentences with the input from the language models 224.

Finally, the post-processor software module(s) 216 may receive the output data from the decoder module(s) 214 for any suitable purpose. In one example, the post-processor software module(s) 216 can identify or select one of the reference patterns from the N-best list of single or multiple word reference patterns as recognized speech. In another example, the post-processor module(s) 216 can be used to convert acoustic data into text or digits for use with other aspects of the ASR system or other vehicle systems. In a further example, the post-processor module(s) 216 can be used to provide training feedback to the decoder 214 or pre-processor 212. More specifically, the post-processor 216 can be used to train acoustic models for the decoder module(s) 214, or to train adaptation parameters for the pre-processor module(s) 212.

The method or parts thereof can be implemented in a computer program product embodied in a computer readable medium and including instructions usable by one or more processors of one or more computers of one or more systems to cause the system(s) to implement one or more of the method steps. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

Figure 3:
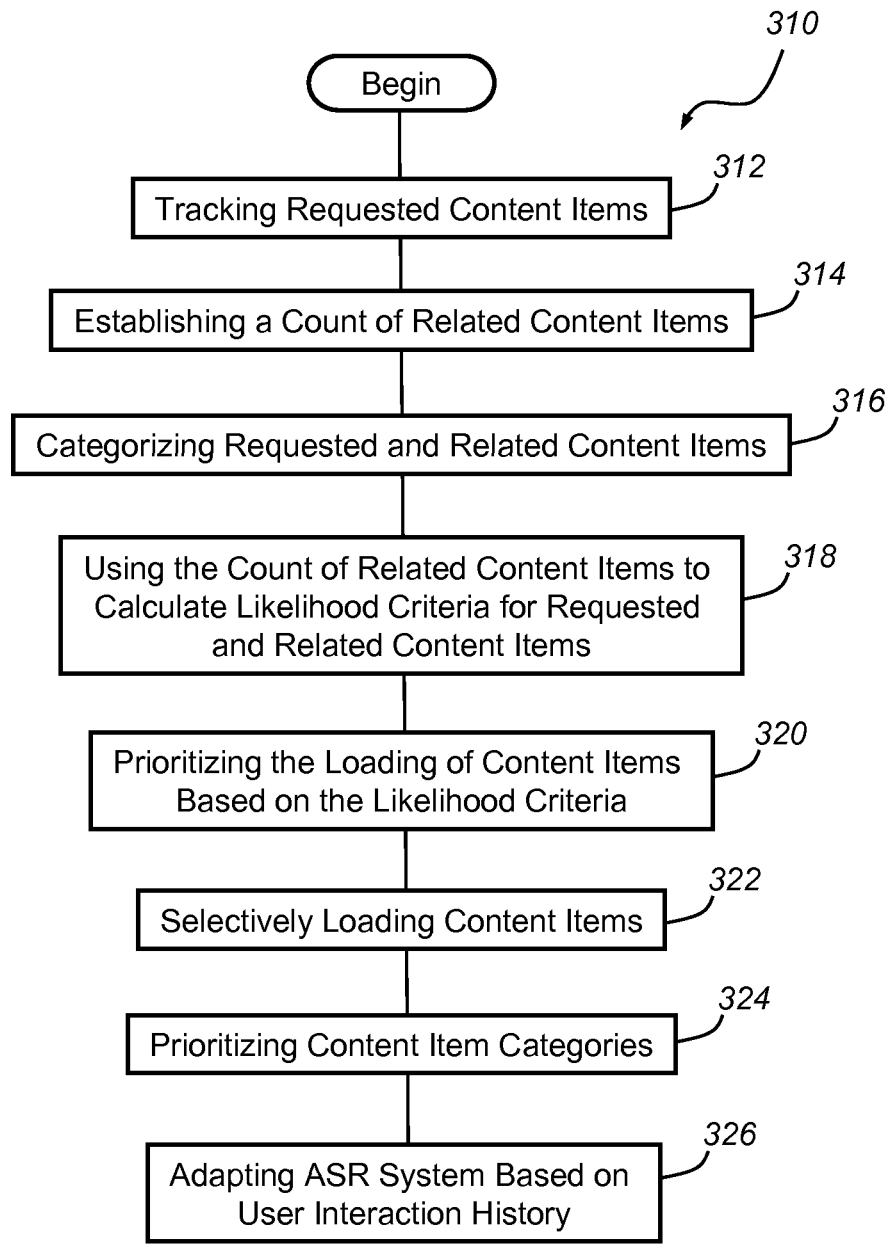
FIG. 3 is a flowchart illustrating method steps that may be used with the communications system and ASR system illustrated in FIGS. 1 and 2.

Turning now to FIG. 3, there is provided a method 310 of prioritizing content loading for vehicle ASR systems. In some embodiments, the method 310 or parts thereof may access or take advantage of content items from various parts of the speech-based user interface and communications system 10, and the method 310 or parts thereof may effectuate different parts and/or processes involved with the ASR system 210. The method 310 may comprise more or fewer steps than what is described below, some steps may be optional, and the order of the steps may be different than what is precisely detailed. Skilled artisans will appreciate the design flexibility involved in creating algorithms and/or other programs or processes for carrying out a method of prioritizing content loading for vehicle ASR systems, and accordingly, any operable combination of method steps or parts of method steps may be employed.

Beginning with step 312, the method tracks requested content items. Content items may include various media content items, phone content items, navigation content items, application-based content items, and/or vehicle diagnostic content items. Content items may include any user ASR system request, including but not limited to, specific voice-to-dial or voice-to-text requests through a user's mobile device, songs, playlists, artists, radio stations, music genres, media streaming sources, videos, addresses, turn-by-turn directions, vehicle diagnostic requests, etc. The content items may be specific to a particular user of the vehicle ASR system, to thereby develop a personalized system interaction history. Or, the content items may be requested by a number of different users. Content items may be from on-board sources, such as from GPS module 40, from off-board sources, such as vehicle diagnostic content items that may be relayed from or managed by a call center, or from third-party sources, such as email providers or application programs, to cite a few examples. Content items from off-board sources and third-party sources may be accessible via telematics unit 30, in some embodiments. In a preferred embodiment, requested content items are counted by source. For example, if a user requests Rolling Stones™ as a content item 38 times, 15 of which were accessed via Spotify™ and 23 of which were accessed via MyMedia™, the count of requested items may include the following: Rolling Stones38:Spotify15:MyMedia23. Further, it should be understood that requesting Spotify™ and MyMedia™ may be content items in and of themselves.

Step 314 involves establishing a count of related content items. Related content items may include a sum total of one requested content item which may or may not be counted by source as described above, and related content items may also include content items from different content item categories or different subcategories of a single content item category, for example. Continuing with the example provided above, a Rolling Stones™ Spotify™ request and a Rolling Stones™ MyMedia™ request may be related content items, or content items that are related to a Rolling Stones™ request may include but are not limited to, classic rock radio stations or music streaming stations, playlists that include Rolling Stones™ songs, Rolling Stones™ videos, etc. In another example, if you request turn-by-turn directions to "Jane's house" related content items may include email or text messages from Jane, Jane's phone contact information, etc. Other examples of how content items may be related are provided in further detail below.

Step 316 is optional, and involves categorizing requested and related content items. In one embodiment, content items may be categorized into a number of content item categories, including but not limited to, media content items, phone content items, and navigation content items. In another embodiment, content item categories may further include vehicle diagnostic content items and other application-based content items. Other content item categories are certainly possible. The content item categories listed herein are merely examples, and further, may not be mutually exclusive. In one embodiment, content item categories may have one or more subcategories. To cite a few examples, the media content item category may be subdivided among artists, playlists, genres, etc. The phone content item category may be subdivided among individual contacts, favorite contacts, family, etc. The navigation content item category may be subdivided among favorite addresses, addresses associated with contact names, recent addresses, etc.

The content item categories and/or any subcategories may be used to help define related content items. In one embodiment, related content items may be defined by an intracategory distribution that includes a plurality of content item categories, with each content item category comprising one or more subcategories. An intracategory distribution involves relating content items based on whether they are in the same content item category. Continuing with the example provided above, Gimmie Shelter (song) may be a related content item with Let it Bleed (album), Rolling Stones™ (artist), and classic rock (genre) based on an intracategory distribution, with songs/albums/artists/genres being various subcategories of the media content item category. In another embodiment, related content items may be defined by an intercategory distribution, in which content items concerning a particular subject matter are considered related, despite the fact that they may be in different content item categories. To reiterate an example provided above, if you request turn-by-turn directions to "Jane's house" (navigation content item) related content items may include email or text messages from Jane (application-based content item), Jane's phone contact information (phone content item), etc. The method 310 may also use a combination of intercategory distribution and intracategory distribution.

Step 318 of the method involves using the count of related content items to calculate likelihood criteria for requested and related content items. In one embodiment, calculating likelihood criteria may simply involve ranking the count of related content items. For example, step 318 may determine that the likelihood criterion of a given content item is higher than another content item if the content item count is higher (e.g., a 38 count for Rolling Stones™ requests is higher than a 35 count for the Beatles™). Calculating likelihood criteria may take into account determining when a content item was added, with recently added content items having a higher likelihood criterion than other content items. Recently added content items may have been added in the last day, the last three, days, etc., and may be at least partially based on the frequency with which the user adds content, for example, by maintaining a list of N recently added content items and removing the least recent content items upon the addition of more recently added content items. Calculating likelihood criteria may involve giving content items a certain probability value, ranking, ratio, percentage, etc., depending on the design of the particular algorithm. Calculating likelihood criteria may generally be considered a way to develop a knowledge base for developing the system interaction history for one or more users.

Step 320 involves prioritizing the loading of content items based on the likelihood criteria. Content items may be loaded onto memory 54 in order to be readily accessed, instead of randomly accessed, by an ASR system user. Thus, by prioritizing the loading of content items based on the likelihood criteria, it is more likely that a previously requested content item or a related content item is readily accessible. If the likelihood criteria are in the form of a ranked list of tracked content items and related content items, for example, content loading will be prioritized in accordance with the ranked list. If the likelihood criteria take into account whether a content item has been recently added, for example, the loading of content may be prioritized based on the recency of the content.

Step 322 involves selectively loading content items. In one embodiment, content items are selectively loaded from each content item category such that content items with a higher count are loaded onto the memory of the vehicle ASR system before content items with a lower count. Content items may be selectively loaded based on the prioritization described with relation to step 320. This step may further include limiting the amount of content items loaded into memory, such as ASR system memory 54, to requested content items and related content items. Typically, the memory limit is about 10,000 content items, and in one embodiment, about half of the memory is dedicated to selectively loaded content items, or content items with a prioritized loading, and the remaining half may not be loaded or may be arbitrarily loaded. Limiting the amount of content items that are selectively loaded or loaded according to a prioritization may benefit certain aspects of the ASR system, including grammar models, dialog flows, and multi-pass recognition. The loading of content items may depend on the implemented database structure and the algorithms or methods associated with the system. If the system includes a real-time query able database, it may be possible to request all content items in certain categories, such as artists, playlists, or genres, for example, and store all of the results that are returned. In other embodiments, there may be a blind sequential loading process where each content item is loaded one after another and the system decides whether to save or discard it. This type of filter may have to be executed recursively with a broader filter with each pass, until the desired limit is reached. Other system implementations, algorithms, etc., are certainly possible.

Step 324 is optional, and involves prioritizing content item categories. In one embodiment, the content item categories may be prioritized by loading content item categories having a higher count of total content items before loading content item categories having a lower count of total content items. For example, if a user requests a proportionate number of phone content items over media content items, the method may proportionately adjust the amount of memory allocated to each content item accordingly. Alternatively, if the default allocation is 4,000 phone contacts and 6,000 songs for selective loading, yet the user requests equal numbers of content items from the phone and media content item categories, then the allocation may be shifted to 5,000 phone content items and 5,000 songs.

Step 326 is an optional step that involves adapting the vehicle ASR system, such as ASR system 210, based on the interaction history of one or more users. As described above, content items that are selectively loaded or loaded according to a prioritization may be advantageous, as optimized content for each dialog step may improve recognition in and of itself, and task completion times may be reduced. Additionally, likelihood criteria may be added to grammar models 218 (e.g., finite-state grammars), word models 222, or sentence/language models 224, and integrated into confidence scores. The likelihood criteria may be added to the result list of a recognition result and accordingly, the confidence scores of the result list may be rescored. Further, likelihood criteria may be used with multi-pass recognition. In one embodiment, in a first pass, if the full recognition attempt fails, they system may try to understand the category or intended user action and perform a second or third pass on content items of the particular category or subcategory. By restricting to the content item category, more content items of this category may be selectively loaded. For example, two-pass recognition may be enabled such that when the number of media content items exceeds the size which can be loaded for a given dialog step or user turn where the amount of content is too large to be loaded completely, a second-pass recognition of the utterance against a selectively loaded, isolated context of the media content items only is performed. In another embodiment, dialog flows may be adapted. If the ASR system does not recognize a user request numerous times, which is likely to happen because limited content is available in the current dialog step, then the ASR system may inform the user to split up the request into smaller steps so that each step in the ASR system has a selectively loaded content item distribution. In another embodiment, informative prompts may be developed. For example, if the ASR system does not recognize a user request, which again, is likely to happen because limited content is available in the current dialog step, they system may inform the user of this limitation and how to overcome it. For example, the system may respond, "Ok, sorry. I may not know the song by name yet. I might recognize the artist or playlist. What would you like?" Once the user chooses the artist of the intended song or chooses manually, the song will become a tracked, requested content item.

In one embodiment of the method 310, each content item category has a different set of domain rules regarding the prioritization and/or selective loading of content items. Further, it may be preferable in some embodiments to only apply domain rules to certain content item categories. In one embodiment, more popular content item categories are subject to domain rules while other content item categories are not, such that the popular content item categories are selectively loaded followed by the generic or arbitrary loading of other content items. The domain rules may generally coincide with the likelihood criteria in some embodiments.

For example, domain rules for a media content item category may include loading recently added media content items first, and then, loading by an intracategory distribution, media content items from narrow subcategories to broad subcategories (e.g., artist, playlist, genre). Subsequently, an intercategory distribution may be used for loading application-based content items (e.g., load requested or related content items that were requested in streaming app sources, observed in broadcast metadata sources, or endorsed as liked in one of those sources). Finally, the media domain rules may load the remaining (or a subset of the remaining) media content items until a threshold number of content items or media content items is met.

Domain rules for a phone content item category may include loading all contact names ever requested by the user by speech or through a phone such as the mobile device 16 (e.g., intracategory distribution), loading recently added contacts, if that information is available, and finally, loading contact names ever requested through other sources (e.g., intercategory distribution) such as messaging apps, email, or other communication sources with which contact information or names are available. Finally, the phone domain rules may load the remaining (or a subset of the remaining) phone content items until a threshold number of content items or phone content items is met.

Domain rules for a navigation content item category may include loading all destinations ever requested by the user by speech or through a navigation system such as GPS module 40 (e.g., intercategory distribution), followed by destinations that can be tracked through other content item categories, such as application-based GPS services or apps that may be on a user's mobile device, such as mobile device 16, including favorites, recents, or similar lists. Destinations in areas of requested destinations may be loaded. Destinations of a similar type may be loaded (e.g., related content items such as all point-of-interest restaurants or gas stations). All destinations available from personal content may be loaded, such as addresses associated with phone content items such as contact names (e.g., intracategory distribution). Finally, the navigation domain rules may load the remaining (or a subset of the remaining) navigation content items until a threshold number of content items or navigation content items is met.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of loading content for a vehicle automatic speech recognition (ASR) system, the vehicle ASR system including a processor and memory, the method comprising the steps of:
   tracking requested content items;
   establishing a count of related content items, wherein related content items are defined by an intercategory distribution and an intracategory distribution;
   categorizing requested and related content items into one or more content item categories, the one or more content item categories including an application-based content item category and a media content item category having a plurality of subcategories;
   calculating likelihood criteria for the requested content items and related content items using the count of related content items and determining when a media content item was added; and
   prioritizing the loading of content items based on the likelihood criteria such that the requested content items and related content items are loaded into the memory of the vehicle ASR system in favor of non-requested content items or non-related content items by loading recently added media content items first, then loading by the intracategory distribution media content items from narrow subcategories to broad subcategories, followed by loading by the intercategory distribution to include application-based content items, and finally, loading remaining media content items until a threshold number of content items or media content items is met.

2. A method of loading content for a vehicle automatic speech recognition (ASR) system, the vehicle ASR system including a processor and memory, the method comprising the steps of:
tracking requested content items, wherein at least some of the content items are contact names;
establishing a count of related content items, wherein related content items are defined by an intercategory distribution and an intracategory distribution;
categorizing requested and related content items into one or more content item categories, the one or more content item categories including an application-based content item category and a phone content item category;
calculating likelihood criteria for the requested content items and related content items using the count of related content items and determining when a contact name was added; and
prioritizing the loading of content items based on the likelihood criteria such that the requested content items and related content items are loaded into the memory of the vehicle ASR system in favor of non-requested content items or non-related content items by loading all contact names ever requested first, then loading recently added contact names, then loading by the intercategory distribution to include application-based related contact names, and finally, loading remaining phone contact names until a threshold number of content items or phone content items is met.

3. A method of loading content for a vehicle automatic speech recognition (ASR) system, the vehicle ASR system including a processor and memory, the method comprising the steps of:
tracking requested content items, wherein at least some of the content items are destinations;
establishing a count of related content items, wherein related content items are defined by an intercategory distribution and an intracategory distribution;
categorizing requested and related content items into one or more content item categories, the one or more content item categories including an application-based content item category, a phone content item category, and a navigation content item category; and
prioritizing the loading of content items based on the likelihood criteria such that the requested content items and related content items are loaded into the memory of the vehicle ASR system in favor of non-requested content items or non-related content items by loading all destinations ever requested first, then loading by the intercategory distribution to include destinations from the application-based category and the phone content item category, followed by loading related destinations, and finally, loading remaining navigation content items until a threshold number of content items or navigation content items is met.

4. The method of claim 1, further comprising the step of limiting the amount of content items loaded into the memory of the vehicle ASR system to requested content items and related content items.

5. The method of claim 1, further comprising the step of adapting the vehicle ASR system based on an interaction history of one or more users by, augmenting one or more grammar models, altering the dialog flow, or performing multi-pass recognition based on the likelihood criteria for the requested content items and the related content items.

6. The method of claim 2, further comprising the step of limiting the amount of content items loaded into the memory of the vehicle ASR system to requested content items and related content items.

7. The method of claim 2, further comprising the step of adapting the vehicle ASR system based on an interaction history of one or more users by, augmenting one or more grammar models, altering the dialog flow, or performing multi-pass recognition based on the likelihood criteria for the requested content items and the related content items.

8. The method of claim 3, further comprising the step of limiting the amount of content items loaded into the memory of the vehicle ASR system to requested content items and related content items.

9. The method of claim 3 further comprising the step of adapting the vehicle ASR system based on an interaction history of one or more users by, augmenting one or more grammar models, altering the dialog flow, or performing multi-pass recognition based on the likelihood criteria for the requested content items and the related content items.

* * * * *